United States Patent Office 3,111,378
Patented Nov. 19, 1963

3,111,378
PROCESS OF TREATING SULFITE SPENT
LIQUOR
Jarrell B. Mugg, Vancouver, Wash., assignor to Crown
Zellerbach Corporation, San Francisco, Calif., a corporation of Nevada
No Drawing. Filed Feb. 27, 1961, Ser. No. 91,573
24 Claims. (Cl. 23—48)

This invention relates to a process of treating sulfite spent liquors containing an alkaline earth metal as a cation. More particularly, the present invention relates to a process for the recovery of chemicals from a sulfite spent liquor containing either calcium or magnesium as a base, which liquor is obtained from digestion of a lignocellulosic plant material by the sulfite pulping process.

In the sulfite process for pulping lignocellulosic plant materials, such as wood or agricultural residues, the lignocellulose material in the form of small pieces is cooked under pressure with an aqueous liquor containing a sulfite or bisulfite and frequency sulfurous acid. The two principal alkaline earth metals employed as cations in the sulfite pulping processes are calcium and magnesium. Accordingly, such processes are termed the calcium-base or magnesium-base sulfite processes.

During cooking of the lignocellulosic material, the cooking liquor reacts preferentially with the lignin and after the digestion of the lignocellulose is completed, the liquor is separated from the cellulosic pulp. The separated liquor is known in the art as sulfite spent liquor. It contains an aqueous solution of lignin compounds, wood sugars and inorganic compounds. While many attempts have been made to provide an economical process for the recovery of chemicals from either calcium or magnesium-base spent sulfite liquors, such attempts have not been entirely successful. For example, in attempting to burn calcium-base sulfite spent liquor, the chemicals combine in the form of calcium sulfate which material is not usable in the pulping process. Accordingly, it has been the common practice to discharge calcium-base sulfite spent liquors into streams, thereby causing a serious public nuisance as well as loss of valuable chemicals.

When magnesium-base sulfite spent liquors are treated for the recovery of chemicals, a proportion of magnesia becomes unreactive due to high temperatures which are necessarily employed during its recovery by incineration and thus the unreactive magnesia can not be reused in the preparation of fresh cooking liquor.

The present invention relates to the geenral problem of utilization of alkaline earth metal base sulfite spent in liquors and has for its general object the provision of a process wherein the inorganic portion of such liquors may be converted easily and economically into useful inorganic chemical products having a wide variety of commercial applications.

It is another object of this invention to provide a cyclic process for the recovery of inorganic chemicals from calcium-base or magnesium-base sulfite spent liquors, wherein the recovered chemicals can be combined to produce fresh cooking liquor for reuse in the pulping process.

Other objects and advantages of the process of this invention will become apparent as the invention is hereinafter more fully described.

Broadly stated, the present invention comprises the process wherein a sulfite spent liquor of the type described hereinabove is evaporated to produce substantially dry solids. The resulting solids are pyrolyzed to produce a carbonaceous solid residue which is then reacted with a hot carbon dioxide-containing gas at an elevated temperature to form a sulfide of the alkaline earth metal corresponding to that of the original sulfite spent liquor. The alkaline earth metal sulfide thus produced may further be reacted with additional amounts of carbon dioxide-containing gas at an elevated temperature to produce a corresponding alkaline earth metal oxide and elemental sulfur. The elemental sulfur thus produced may then be readily separated from the alkaline earth metal oxide. When the resulting chemicals are to be employed in the preparation of fresh cooking liquor, the alkaline earth metal oxide is mixed with water to produce an aqueous hydroxide slurry, while the elemental sulfur is burned in the presence of a free oxygen-containing gas to form sulfur dioxide which subsequently is mixed with the aqueous slurry containing the alkaline earth metal hydroxide to produce fresh cooking liquor for reuse in the pulping process. Although the present process is applicable to sulfite spent liquors containing calcium, magnesium or other alkaline earth metals as a base, it will now be described in greater detail in connection with a calcium-base sulfite spent liquor as a starting material.

As has been indicated above, the calcium-base sulfite spent liquor which may be employed as a starting material for the presently described process is derived from the conventional acid sulfite pulping process in which an aqueous liquor containing calcium bisulfite and sulfurous acid is employed. After the liquor is separated from the cellulosic pulp produced, it usually has a solids concentration of about 10%. In accordance with this invention, the liquor is first concentrated in conventional evaporators to a solids content of approximately 50%, then dried in any suitable drying apparatus in which the remaining portion of water is driven off and the resulting dry solids are pyrolyzed at a temperature in excess of 1600° F., generally in the range of from 1600° F. to 2600° F. for a time sufficient to produce a carbonaceous solid residue having a carbon to sulfur molar ratio of at least 2:1, preferably between about 10:1 and 25:1. A certain amount of auxiliary fuel and air may be introduced into the pyrolyzing zone in order to enhance the carbonization of the sulfite spent liquor solids and to oxidize the volatile pyrolysis products. The oxidized volatile pyrolysis products comprising sulfur dioxide are released from the pyrolyzing zone and cooled in any suitable apparatus to a temperature ranging between about 100° F. and 700° F. in order to prevent formation of sulfur trioxide. The cooled gases are introduced into a vessel containing an aqueous slurry of calcium hydroxide, wherein sulfur dioxide is absorbed, while the remaining portion of non-condensible gases comprising carbon dioxide, nitrogen, and oxygen are released.

The resulting carbonaceous residue containing a major proportion of carbon and minor proportion of calcium sulfate and other calcium compounds is fed into a reaction zone in which it is reacted with hot carbon dioxide containing gas at an elevated temperature to convert calcium sulfate to calcium sulfide. The $CO_2$-containing gas is obtained through combustion of a carbonaceous fuel and should contain at least 15% $CO_2$ by volume. The reaction may be carried out by forming a bed of pyrolyzed solids which is fluidized with the carbon dioxide-containing gas introduced into the reaction zone at a temperature of about 2500° F.–3400° F. The reaction should be carried out in such a way as to maintain the temperature in the reaction zone between about 1300° F. and 2300° F., preferably between 1450° F. and 1800° F. The carbon dioxide introduced in the gas stream into the reaction zone is reduced in the presence of carbon to carbon monoxide. A portion of the carbon monoxide is introduced into a first combustion zone where it is converted in the presence of free oxygen-containing gas, such as air, into carbon dioxide which in turn is fed into the reaction zone. If desired, auxiliary fuel, such as fuel oil, coke, etc., may be introduced in the first combustion zone to enhance the reaction rate. The remaining portion of the carbon monoxide is again divided into two streams whereby one part thereof is directed to a second combustion zone as explained hereinafter and the remaining portion is recovered for use as fuel gas.

It will be understood that the flow rate of the carbon dioxide-containing gas incorporated into the reaction zone may vary depending on a design of the reaction apparatus. However, the amount of carbon dioxide and free oxygen introduced should be sufficient to convert all of the carbon present in the carbonaceous residue into carbon monoxide. In general, a flow rate of the $CO_2$-containing gas of approximately 20–50 standard cubic feet per minute per square foot of bed area should be satisfactory. The resulting crude calcium sulfide may be recovered for use in such industrial applications, as in the manufacture of pharmaceuticals and of paints.

However, the process may be continued whereby the calcium sulfide is directed to a desulfurizing zone where it is reacted at an elevated temperature with additional hot carbon dioxide-containing gas for a time sufficient to produce elemental sulfur and calcium oxide and wherein the resulting elemental sulfur obtained in vapor form may easily and conveniently be separated from the calcium oxide. The calcium sulfide product may be conveniently formed into a bed in the desulfurizing zone where it may be fluidized with the carbon dioxide-containing gas. The temperature of the reaction in the desulfurizing zone may vary to a certain extent, but in general it should not be less than 700° F. and preferably it should range between about 1200° F. and 1700° F. The carbon dioxide-containing gas which is introduced into the desulfurizing zone may be produced by burning in a second combustion zone of a portion of the carbon monoxide generated in the reaction zone. During the desulfurizing step, a gaseous mixture containing vaporized elemental sulfur is released and cooled to condense the elemental sulfur which is thereafter separated by any suitable means from the non-condensible gases comprising nitrogen, carbon dioxide, and carbon monoxide. The condensed sulfur may be solidified in accordance with conventional practice. The elemental sulfur and the calcium oxide obtained from the desulfurizing zone may be employed in many known industrial applications. This sulfur is useful in the production of sulfuric acid and as a vulcanizing agent for rubber. Calcium oxide is useful in making mortar, chlorinated lime, etc.

However, when a recovery of inorganic chemicals in a sulfite pulp mill is contemplated, calcium oxide may be admixed with water to form a calcium hydroxide slurry and the elemental sulfur may be burned in the presence of a free oxygen-containing gas to produce sulfur dioxide gas. The sulfur dioxide gas discharged from the burner at a temperature above 1500° F. is cooled to below 700° F. and admixed with the calcium hydroxide aqueous slurry to produce fresh cooking liquor for reuse in the pulping of a new quantity of lignocellulose. It should be noted that the respective proportions of the sulfur dioxide and the calcium hydroxide may be adjusted depending upon the desired composition of sulfite liquor utilized in the pulping process.

In order to disclose the nature of the invention still more clearly, the following illustrative example is given hereinbelow.

*Example*

This example illustrates the presently described continuous cyclic process for the recovery of inorganic chemicals from calcium-base sulfite spent liquor.

A calcium-base sulfite spent liquor resulting from the pulping of western hemlock and having a solids concentration of 10% is evaporated to 55% solids concentration by weight in multiple-effect Rosenblad evaporators. The concentrated liquor is dried to about 90% solids content by weight in a rotary drier in which a portion of the dried solids is recycled to prevent coating of the drier with dried liquor. The resulting dry solids are passed through crushing rolls to insure that all particles will pass a 3-mesh Tyler screen. Oversize particles are recycled to the crusher. The accepted crushed solids are introduced into a fluidized bed pyrolyzer operating at 2000° F. After having been heated to the operating temperature with an auxiliary fuel, the pyrolyzer temperature is maintained at 2000° F. by combustion of the volatile products driven from the dry solids. The pyrolysis is completed in 10 minutes. The amount of the volatile products is 58% of the dry solids, oven-dry weight. The combustion of the volatile products is effected with preheated air blown through the bed. The air also serves to fluidize the bed.

The volatile pyrolysis products contain about 1% sulfur dioxide by volume. In order to recover heat and sulfur dioxide, these products are pased first through a packed cooling tower maintained at a temperature of 200° F. and then through a series of three primary absorption towers containing an aqueous slurry of calcium hydroxide in which sulfur dioxide is absorbed while the non-condensible gases are released. Water from the cooling tower is recycled through heat exchangers to remove heat and produce hot process water. The product of the absorption towers is weak sulfite cooking liquor which is pumped to a secondary calcium hydroxide containing absorption tower where it is fortified with additional sulfur dioxide, as will be described hereinafter.

The pyrolyzed solids which are composed of 63% carbon, 24% calcium sulfate, 9% calcium oxide, and 4% calcium sulfide by weight and thus having a carbon/sulfur molar ratio of 22.5:1 are again crushed to pass a 10-mesh Tyler screen and then introduced into a fluidized bed reactor maintained at a temperature of 1650° F. During the reaction, the carbon is oxidized to carbon monoxide, which in turn reduces the calcium sulfate to calcium sulfide. Thus, the solid product recovered from the reactor is crude calcium sulfide containing 61% calcium sulfide and 39% calcium oxide by weight.

Oxidation of the carbon is attained with a hot gas stream composed of 17.6% carbon dioxide, 3.5% oxygen and 78.9% nitrogen by volume. The gas stream is introduced into the reactor at a rate of 35 standard cubic feet of gas per minute per square foot of bed area at a temperature of 3000° F. The carbon dioxide-containing gas stream is obtained by recycling 43% by volume of the carbon monoxide-containing gases coming from the reactor to the first combustion zone, i.e. a burner located beneath the reactor. Substantially dry preheated air is introduced into the burner and mixed with the recycled gases which contain 15.6% carbon monoxide. The mixture is burned to give the desired carbon dioxide-containing gas stream entering the reactor.

The carbon monoxide-containing gases from the first reactor are cooled to 600° F. This is accomplished by passing them through heat exchangers in which air going to the burners is used as the coolant, and is thereby preheated.

The carbon dioxide-containing gas stream causes fluidization of the reaction bed, thus producing a uniform temperature throughout the reaction zone and effecting an intimate contact between the gas stream and the reacting solid particles.

The crude calcium sulfide is next fed to a fluidized bed desulfurizing zone which is maintained at a temperature of 1400° F. with a fluidizing gas flow rate of 36.4 standard cubic feet per minute per square foot of bed area. The fluidizing carbon dioxide-containing gas which enters at 3100° F. is composed of 21.2% carbon dioxide and 78.8% nitrogen by volume and is obtained by combustion in the second combustion zone of 3% of the recycled carbon monoxide-containing gas from the first reactor. The remaining 54% of the recycled carbon monoxide-containing gas is used as a fuel.

The gases leaving the desulfurizing zone contain 7% vaporized elemental sulfur by volume. To recover the sulfur, the gases are cooled to 300° F. in a condenser, whereby sulfur is liquefied and tapped from the bottom of the condenser, while the non-condensible gases are released.

The residual calcium oxide from the desulfurizing zone is slaked and about a half of the resulting calcium hydroxide slurry is pumped to the primary absorption towers previously mentioned for absorbing sulfur dioxide from the volatile pyrolysis products, while the other half is pumped to the secondary absorption tower in which it is mixed with the weak cooking liquor prepared in the primary towers to produce fresh cooking liquor. The recovered liquid sulfur is pumped to a sulfur burner where it is burned in the presence of air to form sulfur dioxide which is cooled in a Jenssen cooler and directed to the fortification tower wherein it is admixed with the weak cooking liquor as mentioned hereinabove. The resulting fortified fresh cooking liquor is directed to the digesters for use in the pulping of a new quantity of lignocellulose.

The process described hereinabove also permits recovery of elemental sulfur and calcium oxide for use in any of the several known industrial applications.

While the invention has been illustrated by way of the foregoing example in connection with calcium-base sulfite spent liquor, other alkaline earth metal-base sulfite spent liquors, particularly magnesium, are equally suitable as starting materials.

Accordingly, it will be apparent that by the present invention, I have provided a process for treating sulfite spent liquor to produce alkaline earth metal sulfides or oxides and elemental sulfur. Also, the process of this invention may be effectuated as a continuous cyclic process in a sulfite pulp mill wherein the inorganic chemicals are substantially completely recovered to produce fresh cooking liquor for reuse in pulping operations. The process is easily carried out and may be effectuated inexpensively on a large commercial scale. It thus provides a practical means of converting a waste material, i.e. sulfite spent liquor to commercially useful products.

It will be understood by those skilled in the art that reasonable variations and modifications are possible within the scope of the foregoing disclosure and the appended claims.

I claim:

1. The process of treating sulfite spent liquor obtained from digestion of a lignocellulosic plant material with a cooking liquor containing an alkaline earth metal salt selected from the group consisting of sulfites and bisulfites which comprises the steps of: (1) evaporating said liquor to produce substantially dry solids, (2) pyrolyzing said solids at an elevated temperature for a time sufficient to release volatile products therefrom and to produce a carbonaceous solid residue having a carbon/sulfur molar ratio of at least 2:1, and (3) reacting said residue with hot carbon dioxide-containing gas at an elevated temperature to form the corresponding alkaline earth metal sulfide.

2. The process of claim 1 wherein said alkaline earth metal is calcium.

3. The process of claim 1 wherein said alkaline earth metal is magnesium.

4. The process of claim 1 wherein said dry solids are pyrolyzed at a temperature in excess of 1600° F.

5. The process of claim 1 wherein said carbonaceous solid residue has a molar ratio between carbon and sulfur between about 10:1 and 25:1.

6. The process of claim 1 wherein the carbon dioxide-containing gas contains at least 15% $CO_2$ by volume.

7. The process of claim 1 wherein said residue is reacted with said gas at a temperature between about 1300° F. and 2300° F.

8. The process of claim 1 wherein said residue is reacted with said gas at a temperature between about 1450° F. and 1800° F.

9. The process of claim 1 wherein the alkaline earth metal sulfide is reacted with additional carbon dioxide-containing gas at an elevated temperature to produce elemental sulfur and a corresponding metal oxide and separating said elemental sulfur from said metal oxide.

10. The process of claim 9 wherein the additional carbon dioxide-containing gas contains at least 15% $CO_2$ by volume.

11. The process of claim 9 wherein said metal sulfide is reacted at a temperature in excess of 700° F.

12. The process of claim 9 wherein said metal sulfide is reacted at a temperature between about 1200° F. and 1700° F.

13. A continuous cyclic process for the recovery of chemicals from sulfite spent liquor obtained from the digestion of a lignocellulosic plant material with a sulfite cooking liquor containing, as a cation, an alkaline earth metal selected from the group consisting of calcium and magnesium which comprises the steps of: (1) separating said spent liquor from the pulp produced, (2) evaporating said spent liquor to produce substantially dry solids, (3) pyrolyzing said dry solids at an elevated temperature for a time sufficient to release therefrom the volatile products comprising sulfur dioxide and to produce a carbonaceous solid residue having a carbon/sulfur molar ratio of at least 2:1, (4) reacting said residue in a reaction zone with hot carbon dioxide-containing gas at an elevated temperature to form the corresponding alkaline earth metal sulfide, (5) reacting said sulfide in a desulfurizing zone at an elevated temperature with additional hot carbon dioxide-containing gas to release a gaseous mixture containing vaporized elemental sulfur and to produce a solid residue of a corresponding metal oxide, (6) mixing said metal oxide with water to form a corresponding metal hydroxide, (7) cooling said gaseous mixture to condense the elemental sulfur, (8) separating the condensed sulfur from the non-condensible gases, (9) burning the resulting elemental sulfur in the presence of a free-oxygen-containing gas to form sulfur dioxide, and (10) mixing the sulfur dioxide with said metal hydroxide to produce fresh sulfite cooking liquor for reuse in the pulping process.

14. The process of claim 13 wherein said dry solids are pyrolyzed at a temperature in excess of 1600° F.

15. The process of claim 13 wherein said carbonaceous solid residue has a molar ratio between carbon and sulfur between about 10:1 and 25:1.

16. The process of claim 13 including the steps of cooling said volatile products, mixing said products with a portion of the corresponding alkaline earth metal hydroxide whereby $CO_2$ is absorbed therein while the remaining portion of said products is released, and utilizing the resulting liquor in the preparation of fresh cooking liquor.

17. The process of claim 13 wherein said residue is reacted in said reaction zone at a temperature between about 1300° F. and 2300° F.

18. The process of claim 13 wherein said residue is reacted in said reaction zone at a temperature between about 1450° F. and 1800° F.

19. The process of claim 13 including the steps of withdrawing CO formed in the reaction zone, burning a portion of the CO in a first combustion zone in the presence of free oxygen-containing gas to form a $CO_2$-containing gas and directing said $CO_2$-containing gas to said reaction zone.

20. The process of claim 19 wherein an auxiliary fuel is introduced into the first combustion zone.

21. The process of claim 19 including the steps of burning another portion of the CO in a second combustion zone in the presence of free oxygen-containing gas to form additional $CO_2$-containing gas and directing said additional $CO_2$-containing gas to said desulfurizing zone.

22. The process of claim 21 wherein an auxiliary fuel is introduced into said second combustion zone.

23. The process of claim 13 wherein said sulfide is reacted in said desulfurizing zone at a temperature in excess of 700° F.

24. The process of claim 13 wherein said sulfide is reacted in said desulfurizing zone at a temperature between about 1200° F. and 1700° F.

References Cited in the file of this patent

UNITED STATES PATENTS

| | | |
|---|---|---|
| 1,560,900 | Drewsen | Nov. 10, 1925 |
| 2,269,608 | Strieby | Jan. 13, 1942 |
| 2,872,289 | Samuelson | Feb. 3, 1959 |

OTHER REFERENCES

Sillen: "Svensk Papperstidning," vol. 55; No. 16½, September 4, 1952, pp. 622–631.

Jacobson: "Encyclopedia of Chemical Reactions," vol. 2; 1948; p. 154.